(12) United States Patent
Tajima et al.

(10) Patent No.: US 12,523,553 B2
(45) Date of Patent: Jan. 13, 2026

(54) CAPACITIVE PRESSURE-SENSITIVE SENSOR

(71) Applicant: TOYODA GOSEI CO., LTD., Kiyosu (JP)

(72) Inventors: Yoshinao Tajima, Kiyosu (JP); Takahisa Kohama, Kiyosu (JP); Eisuke Sumida, Kiyosu (JP)

(73) Assignee: Toyoda Gosei Co., Ltd., Kiyosu (JP)

( * ) Notice: Subject to any disclaimer, the term of this patent is extended or adjusted under 35 U.S.C. 154(b) by 304 days.

(21) Appl. No.: 18/284,227

(22) PCT Filed: Dec. 9, 2021

(86) PCT No.: PCT/JP2021/045254
§ 371 (c)(1),
(2) Date: Sep. 26, 2023

(87) PCT Pub. No.: WO2022/209026
PCT Pub. Date: Oct. 6, 2022

(65) Prior Publication Data
US 2024/0369427 A1    Nov. 7, 2024

(30) Foreign Application Priority Data
Mar. 30, 2021   (JP) .................. 2021-056972

(51) Int. Cl.
*G01L 1/14*   (2006.01)
(52) U.S. Cl.
CPC .................. *G01L 1/142* (2013.01)
(58) Field of Classification Search
CPC ............ G01L 1/142; G01L 1/14; G01L 1/146
See application file for complete search history.

(56) References Cited

U.S. PATENT DOCUMENTS

| 4,644,801 A | 2/1987 | Kustanovich |
| 7,466,879 B2 * | 12/2008 | Tjin ................. G01L 1/246 385/12 |

(Continued)

FOREIGN PATENT DOCUMENTS

| CN | 1148166 A * | 4/1997 | ............. G01L 1/142 |
| JP | 02-078925 A | 3/1990 | |

(Continued)

OTHER PUBLICATIONS

International Search Report (ISR) (PCT Form PCT/ISA/210), in PCT/JP2021/045254, dated Mar. 1, 2022, with translation of relevant portion.

(Continued)

*Primary Examiner* — Octavia Hollington
(74) *Attorney, Agent, or Firm* — McGinn I.P.Law Group, PLLC

(57) ABSTRACT

An object of the present invention is to reduce the hysteresis loss ratio of a capacitive pressure-sensitive sensor by forming elastic layers from two types of elastic materials (i.e., a certain elastic material and an additional specific elastic material) when the hysteresis loss ratio is high in the capacitive pressure-sensitive sensor including the elastic layers formed only of the certain elastic material.

The capacitive pressure-sensitive sensor includes a first electrode, a first elastic layer, a second electrode, a second elastic layer, and a third electrode that are laminated in this order. The first elastic layer and the second elastic layer exhibit different stresses as measured during compression and decompression at a rate of 0.5 mm/minute at 23° C. when the capacitive hysteresis loss ratio is the maximum, and the stress difference is 3 kPa or more.

4 Claims, 3 Drawing Sheets

(56) References Cited

U.S. PATENT DOCUMENTS

| | | | |
|---|---|---|---|
| 10,176,903 B2* | 1/2019 | Sekitani | H01L 23/5328 |
| 11,251,356 B2* | 2/2022 | Van Den Ende | H10N 30/802 |
| 2007/0280583 A1 | 12/2007 | Tjin | |
| 2018/0248105 A1 | 8/2018 | Van Den Ende et al. | |
| 2020/0069193 A1* | 3/2020 | Khine | A61B 5/02141 |
| 2022/0033590 A1 | 2/2022 | Tajima et al. | |

FOREIGN PATENT DOCUMENTS

| | | | |
|---|---|---|---|
| JP | 3593184 B2 * | 11/2004 |
| JP | 2017-203691 A | 11/2017 |
| JP | 2018-528070 A | 9/2018 |
| JP | 2020-055929 A | 4/2020 |
| JP | 6693260 B2 | 5/2020 |

OTHER PUBLICATIONS

Written Opinion of the ISA (PCT Form PCT/ISA/237) in PCT/JP2021/045254, dated Mar. 1, 2022.

International Preliminary Report on Patentability (PCT Chapter I) issued Oct. 3, 2023 for International Application No. PCT/JP2021/045254, and English Translation thereof.

English Translation of Written Opinion of the International Searching Authority in International Application No. PCT/JP2021/045254 dated Mar. 1, 2022.

Notification of Transmittal of Translation of the International Preliminary Report on Patentability in International Application No. PCT/JP2021/045254 dated Oct. 12, 2023.

* cited by examiner

COMPARATIVE EXAMPLE 1

COMPARATIVE EXAMPLE 4

EXAMPLE 1

F I G. 3
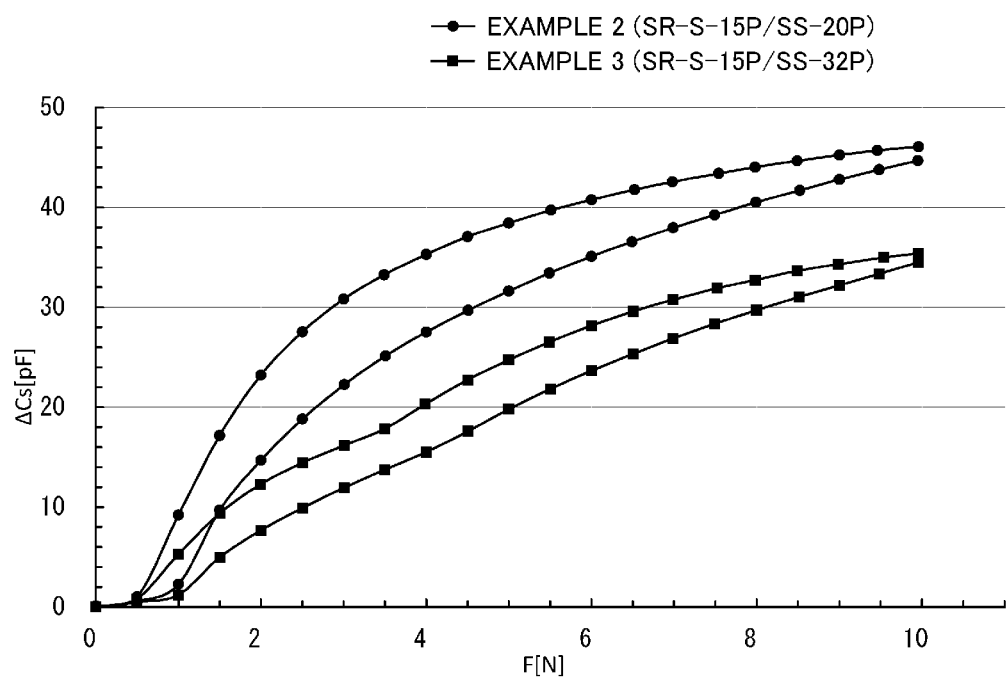

CAPACITIVE PRESSURE-SENSITIVE SENSOR

TECHNICAL FIELD

The present invention relates to a capacitive pressure-sensitive sensor.

BACKGROUND ART

In a capacitive pressure-sensitive sensor, when a compressive force acts on the sensor, a dielectric elastic material is compressed, and the capacitance increases between electrodes separated by the dielectric elastic material. Thus, the compressive force acting on the sensor is measured by detecting and measuring an increase in the capacitance.

Patent Document 1 discloses a capacitive pressure-sensitive sensor including a detection electrode, dielectric elastic materials laminated on both surfaces of the detection electrode, and driving electrodes laminated on both surfaces of the laminate. This document only describes "for example, elastic rubber" as for the dielectric elastic material.

Patent Document 2 discloses a capacitive sensor including a first conductive layer, a first dielectric layer, a second conductive layer, a second dielectric layer, a third conductive layer, and a second insulating layer that are laminated in this order, wherein the second dielectric layer is harder than the first dielectric layer, and the second dielectric layer has a larger Young's modulus than the first dielectric layer. The purpose of the disclosed sensor is to realize a sensor exhibiting a wide dynamic range of measurable loads.

PRIOR ART DOCUMENTS

Patent Documents

Patent Document 1: Japanese Unexamined Patent Application Publication No. 2-78925 (JP 2-78925 A)
Patent Document 2: Japanese Patent No. 6693260

SUMMARY OF THE INVENTION

Problems to be Solved by the Invention

The use of a soft elastic material having a small Young's modulus as a dielectric elastic material is effective for increasing the sensitivity of a capacitive pressure-sensitive sensor, i.e., for detecting a smaller compressive force. However, a soft elastic material (e.g., a soft polyurethane material) has low resilience and tends to cause large hysteresis loss. As described in Comparative Example 2 hereinbelow, the present inventors prototyped a capacitive pressure-sensitive sensor using a polyurethane material, and the capacitive pressure-sensitive sensor exhibited a hysteresis loss ratio of more than 20%.

Such a problem is not recognized in Patent Documents 1 and 2, and the problem cannot be solved even when the Young's modulus of the second dielectric layer is made larger than that of the first dielectric layer as described in Patent Document 2.

In view of the foregoing, an object of the present invention is to reduce the hysteresis loss ratio of a capacitive pressure-sensitive sensor by forming elastic layers from two types of elastic materials (i.e., a certain elastic material and an additional specific elastic material) when the hysteresis loss ratio is high in the capacitive pressure-sensitive sensor including the elastic layers formed only of the certain elastic material.

More preferably, an object of the present invention is to provide a capacitive pressure-sensitive sensor that achieves a hysteresis loss ratio lower than the hysteresis loss ratio of a capacitive pressure-sensitive sensor produced by using only the additional specific elastic material, and that enables shortening of a recovery period between a measurement period and a non-measurement period (normal period) and thus is suitable for repeated measurement.

Means for Solving the Problems

The present invention has been accomplished on the basis of studies focusing on the stress when the hysteresis loss ratio is the maximum, which is the cause of the aforementioned problem. Thus, the present invention provides the following means.

The present invention provides a capacitive pressure-sensitive sensor including a first electrode, a first elastic layer, a second electrode, a second elastic layer, and a third electrode that are laminated in this order, characterized in that:

the first elastic layer and the second elastic layer exhibit different stresses as measured during compression and decompression at a rate of 0.5 mm/minute at 23° C. when a capacitive hysteresis loss ratio is the maximum, and a stress difference is 3 kPa or more.

A stress of the capacitive pressure-sensitive sensor as measured during compression and decompression at a rate of 0.5 mm/minute at 23° C. when a capacitive hysteresis loss ratio is the maximum is preferably an intermediate value between the stress of the first elastic layer and the stress of the second elastic layer.

Each of the first elastic layer and the second elastic layer is preferably a foamed product. The sensitivity of the sensor can be increased since a foamed product is softer than a non-foamed product.

Effects

Since the difference in stress between the first elastic layer and the second elastic layer is 3 kPa or more when the aforementioned hysteresis loss ratio is the maximum, the capacitive hysteresis loss property of the sensor can be controlled, and the maximum capacitive hysteresis loss ratio of the sensor is lower than the maximum capacitive hysteresis loss ratio of at least one of the first elastic layer and the second elastic layer exhibiting higher capacitive hysteresis loss ratio. Thus, the recovery period between a measurement period and a normal period can be shortened.

Effects of the Invention

According to the present invention, the hysteresis loss ratio of a capacitive pressure-sensitive sensor can be reduced by forming elastic layers from two types of elastic materials (i.e., a certain elastic material and an additional specific elastic material) when the hysteresis loss ratio is high in the capacitive pressure-sensitive sensor including the elastic layers formed only of the certain elastic material.

BRIEF DESCRIPTION OF THE DRAWINGS

FIG. 3 is a graph showing capacitance-load curves obtained by the test in Examples 2 and 3.

MODES FOR CARRYING OUT THE INVENTION

[1] First Elastic Layer, Second Elastic Layer

Each of the materials of first and second elastic layers may be any dielectric elastomer.

Examples of the dielectric elastomer include, but are not particularly limited to, polyurethane, silicone, thermoplastic elastomer, natural rubber, nitrile rubber, acrylic rubber, urea rubber, fluororubber, and crosslinked polyrotaxane.

The materials of the first elastic layer and the second elastic layer may be the same type of materials so that the difference in stress between these elastic layers is 3 kPa or more when the aforementioned hysteresis loss ratio is the maximum, or the materials of the first elastic layer and the second elastic layer may be the different types of materials so that the difference in stress between these elastic layers is 3 kPa or more when the aforementioned hysteresis loss ratio is the maximum.

The difference in stress between the first and second elastic layers when the aforementioned hysteresis loss ratio is the maximum is more preferably 10 kPa or more, and most preferably 11.5 kPa or more, since an increase in the stress difference can lead to easy control of the capacitive hysteresis property of the sensor, resulting in a decrease in the maximum capacitive hysteresis loss ratio of the sensor.

[2] First Electrode, Second Electrode, Third Electrode

No particular limitation is imposed on the material of each of these electrodes, but the material is preferably one that can follow the compressive deformation of the first and second elastic layers. Examples of the material include an electrically conductive particle layer, an electrically conductive coating film, and an elastomer whose surface or interior is provided with electrical conductivity.

Examples of the electrically conductive particle include, but are not particularly limited to, particles of carbon black, carbon nanotube, platinum, gold, silver, copper, and nickel.

Examples of the elastomer include, but are not particularly limited to, dielectric elastomers exemplified above in [1].

[3] Insulating Layer

Preferably, an insulating layer is laminated on the opposite side of the first electrode from the first elastic layer.

Preferably, an insulating layer is laminated on the opposite side of the third electrode from the second elastic layer.

This is because the insulating layer can prevent a change in the capacitance of the sensor due to electrical disturbance, and can protect the first electrode or the third electrode to thereby enhance the durability.

Examples of the material of the insulating layer include, but are not particularly limited to, a resin plate and an elastomer plate.

EXAMPLES

Figure 1A:
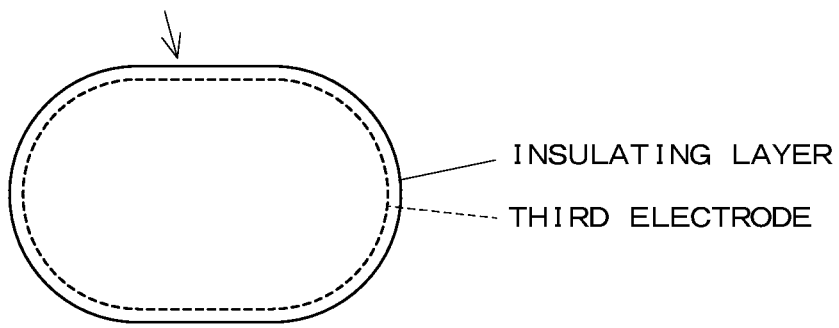
FIG. 1A is a plan view of a capacitive pressure-sensitive sensor of each of Examples and Comparative Examples.
Figure 1B:
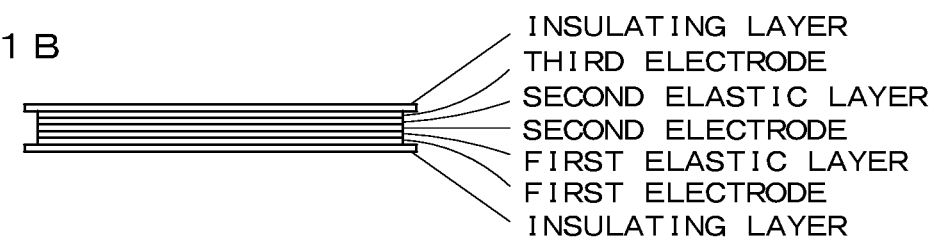
FIG. 1B is a front view of the capacitive pressure-sensitive sensor.
Figure 1C:
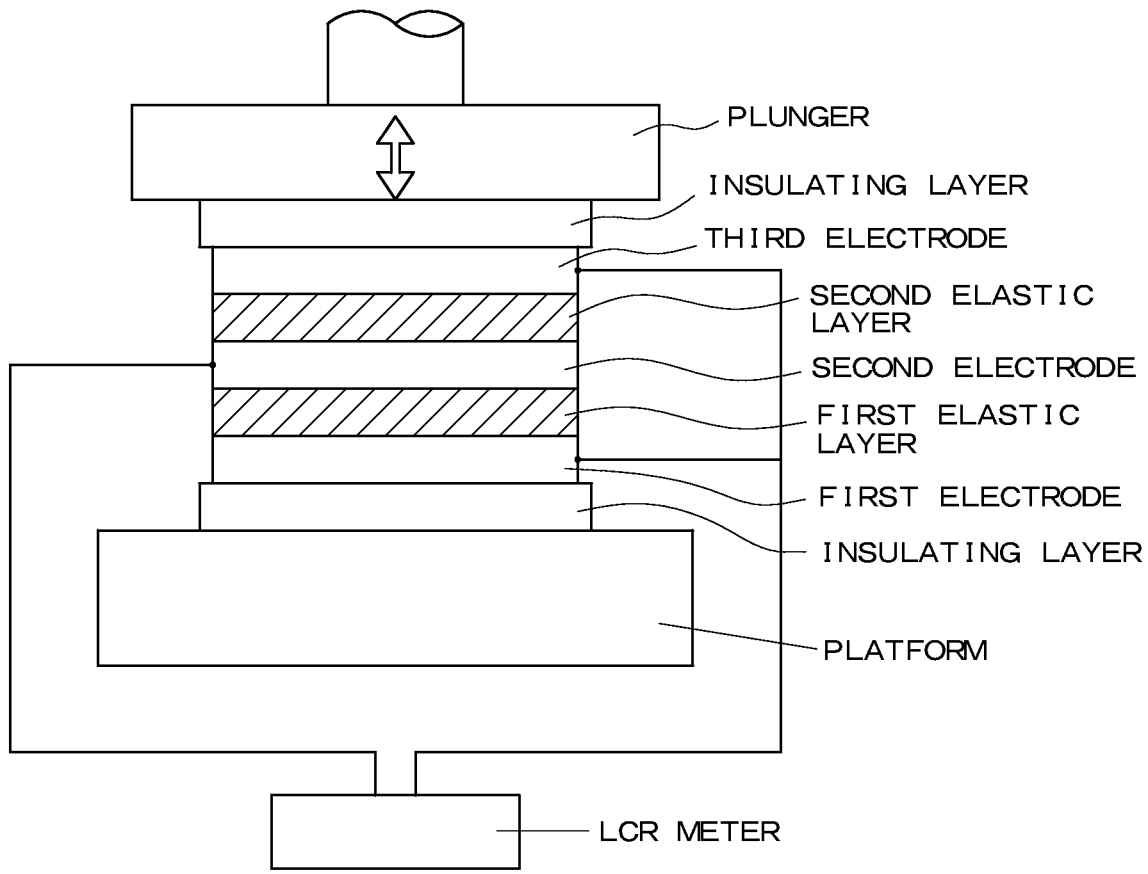
FIG. 1C is a front view of the capacitive pressure-sensitive sensor showing layers with enlarged thicknesses and a method of measuring a capacitive hysteresis loss.

As shown in FIGS. 1A, 1B, and 1C, a capacitive pressure-sensitive sensor was produced by laminating an insulating layer, a first electrode, a first elastic layer, a second electrode, a second elastic layer, a third electrode, and an insulating layer in this order from the bottom (Comparative Examples 1 to 4 and Examples 1 to 3).

As shown in Table 1, the only difference between these examples is the polyurethane materials used for the first elastic layer and the second elastic layer, and the materials of the other components are common. In each of Comparative Examples 1 to 4, the first elastic layer and the second elastic layer were formed from the same polyurethane material. In each of Examples 1 to 3, the first elastic layer and the second elastic layer were formed from different polyurethane materials.

TABLE 1

| | | Comparative Example 1 | Comparative Example 2 | Comparative Example 3 |
|---|---|---|---|---|
| | Polyurethane material of second elastic layer | SR-S-15P | SS-20P | SS-32P |
| | Polyurethane material of first elastic layer | SR-S-15P | SS-20P | SS-32P |
| | Difference in the following stress between both elastic layers | 0 Pa | 0 Pa | 0 Pa |
| | Measurement load | 10N | 10N | 10N |
| | Amount of displacement at maximum load [μm] | | | |
| Capacitance | Initial value [pF] | 20.67 | 21.91 | 29.19 |
| | At maximum load [pF] | 63.16 | 63.39 | 53.43 |
| | Amount of change [pF] | 42.49 | 41.48 | 24.24 |
| | Rate of change Linearity during compressing (going) | 206% | 189% | 83% |

TABLE 1-continued

| | | | | |
|---|---|---|---|---|
| Hysteresis loss | Maximum | 14.5% | 20.1% | 17.4% |
| | Load at maximum | 1.3N | 2.8N | 5.7N |
| | Elastic layer stress at maximum | 3.3 kPa | 7.1 kPa | 14.4 kPa |
| | Sensor stress at maximum | ↑ | ↑ | ↑ |

| | | Comparative Example 4 | Example 1 | Example 2 |
|---|---|---|---|---|
| | Polyurethane material of second elastic layer | WP-24P | SR-S-15P | SR-S-15P |
| | Polyurethane material of first elastic layer | WP-24P | WP-24P | SS-20P |
| | Difference in the following stress between both elastic layers | 0 Pa | 12 kPa | 3.8 kPa |
| | Measurement load | 10N | 10N | 10N |
| | Amount of displacement at maximum load [μm] | | | 657 |
| Capacitance | Initial value [pF] | 21.87 | 21.00 | 21.21 |
| | At maximum load [pF] | 41.31 | 51.97 | 65.89 |
| | Amount of change [pF] | 19.44 | 30.97 | 44.68 |
| | Rate of change | 89% | 147% | 210.7% |
| | Linearity during compressing (going) | | | 93.0% |
| Hysteresis loss | Maximum | 15.7% | 12.3% | 19.3% |
| | Load at maximum | 6.2N | 3.6N | 2.67N |
| | Elastic layer stress at maximum | 15.6 kPa | | |
| | Sensor stress at maximum | ↑ | 9.1 kPa | 6.3 kPa |

| | | Example 3 |
|---|---|---|
| | Polyurethane material of second elastic layer | SR-S-15P |
| | Polyurethane material of first elastic layer | SS-32P |
| | Difference in the following stress between both elastic layers | 11 kPa |
| | Measurement load | 10N |
| | Amount of displacement at maximum load [μm] | 639 |
| Capacitance | Initial value [pF] | 25.20 |
| | At maximum load [pF] | 59.66 |
| | Amount of change [pF] | 34.46 |
| | Rate of change | 136.7% |
| | Linearity during compressing (going) | 99.0% |
| Hysteresis loss | Maximum | 14.6% |
| | Load at maximum | 4.5N |
| | Elastic layer stress at maximum | |
| | Sensor stress at maximum | 11.3 kPa |

The polyurethane materials used for the first elastic layer and the second elastic layer are products available from Rogers Inoac Co., Ltd.

The model number "SR-S-15P_t0.5" corresponds to a material prepared by integrally molding a polyurethane foam (thickness: 0.5 mm) characterized by low resilience and softness with a PET film (thickness: 50 μm).

The model number "SS-20P_t0.5" and the model number "SS-32P_t0.5" correspond to materials prepared by integrally molding a polyurethane foam (thickness: 0.5 mm) characterized by high resilience and softness with a PET film (thickness: 50 μm). These materials have different densities.

The model number "WP-24P_t0.5" corresponds to a material prepared by integrally molding a water-repellent polyurethane foam (thickness: 0.5 mm) with a PET film (thickness: 50 μm).

Table 2 shows the properties (catalog values) of these polyurethane materials.

TABLE 2

| Material name | Thickness [mm] | Density [kg/m$^3$] | 25% Compressive load [MPa] | Compressive residual strain |
|---|---|---|---|---|
| SR-S-15P__t0.5 | 0.5 | 150 | 0.006 | 1.0% |
| SS-20P__t0.5 | 0.5 | 197 | 0.005 | 1.1% |
| SS-32P__t0.5 | 0.5 | 320 | 0.007 | 2.0% |
| WP-24P-t0.5 | 0.5 | 240 | 0.022 | 4.2% |

Each of the first electrode, the second electrode, and the third electrode is a thin film (thickness: 8 μm) wherein fine silver powder particles are homogeneously dispersed in a polyester resin.

The insulating layers on both sides of the sensor are polycarbonate thin plates (thickness: 0.5 mm).

Each of the first electrode, the first elastic layer, the second electrode, the second elastic layer, and the third electrode has an oval shape in plan view and a plan view area of 397 mm$^2$.

The insulating layers on both sides of the sensor have an oval shape and are one size larger than the first electrode, etc.

A double-sided adhesive tape (not shown) is provided between the insulating layer and the first electrode, between the first electrode and the first elastic layer, between the first elastic layer and the second electrode, between the second electrode and the second elastic layer, between the second elastic layer and the third electrode, and between the third electrode and the insulating layer, and these components are bonded together with the adhesive tape.

Each of the above-configured capacitive pressure-sensitive sensors of Examples 1 to 3 and Comparative Examples 1 to 4 was tested for the capacitive hysteresis loss property as described below.

As shown in FIG. 1C, the test was performed with a stroke tester that can repeatedly compress and decompress a test piece at any rate and an LCR meter that can measure a capacitance. The capacitive pressure-sensitive sensor was placed (the first electrode down, the third electrode up) on the rigid platform of the tester. The first electrode and the third electrode were connected to one input terminal of the LCR meter, and the third electrode was connected to the other input terminal.

The plunger (having a flat lower surface) of the tester was operated and abutted to the insulating layer, and compression (lowering) and decompression (lifting) were performed at a rate of 0.5 mm/minute at 23° C., to thereby record capacitance-load curves three times. The maximum load was set to 10 N.

Figure 2A:
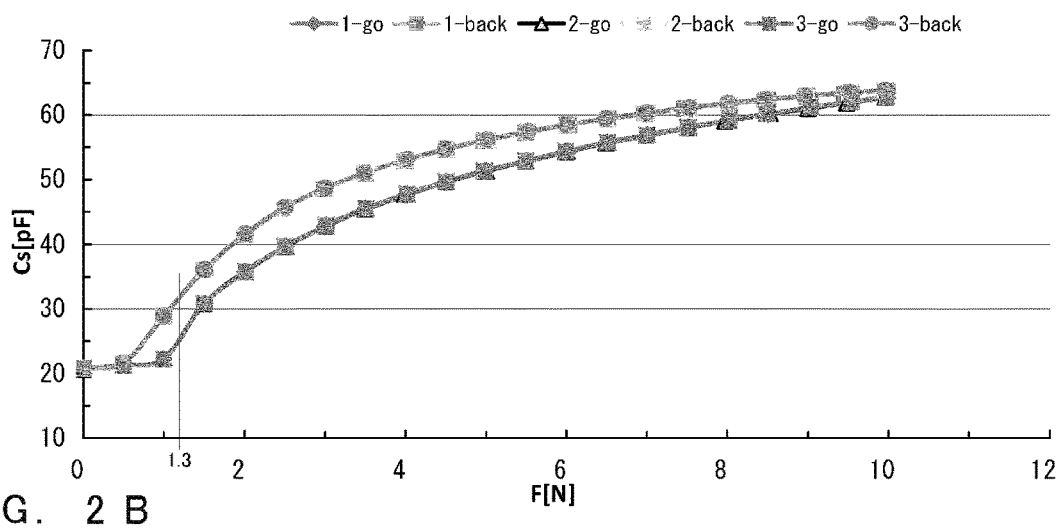
FIG. 2A is a graph showing capacitance-load curves obtained by the test in Comparative Example 1.
Figure 2B:
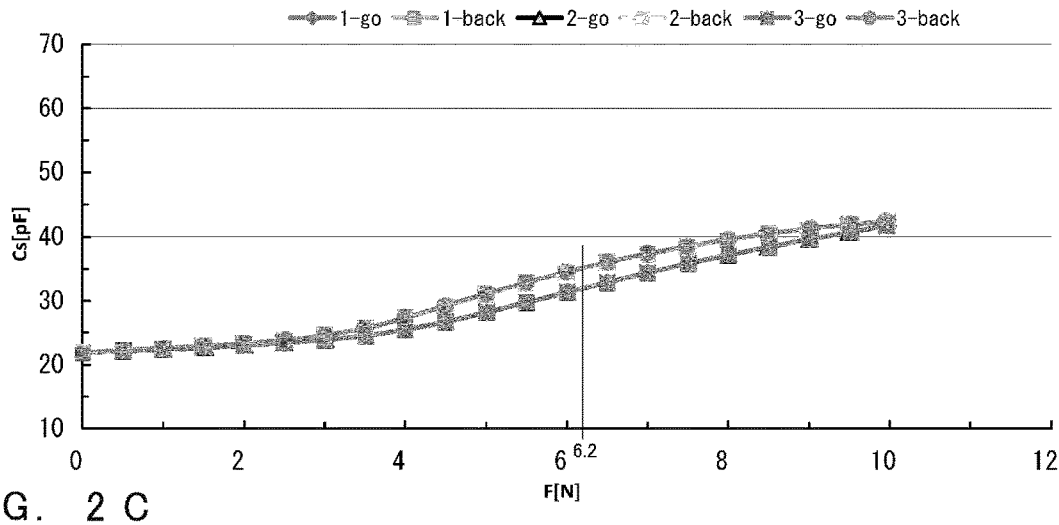
FIG. 2B is a graph showing capacitance-load curves obtained by the test in Comparative Example 4.
Figure 2C:
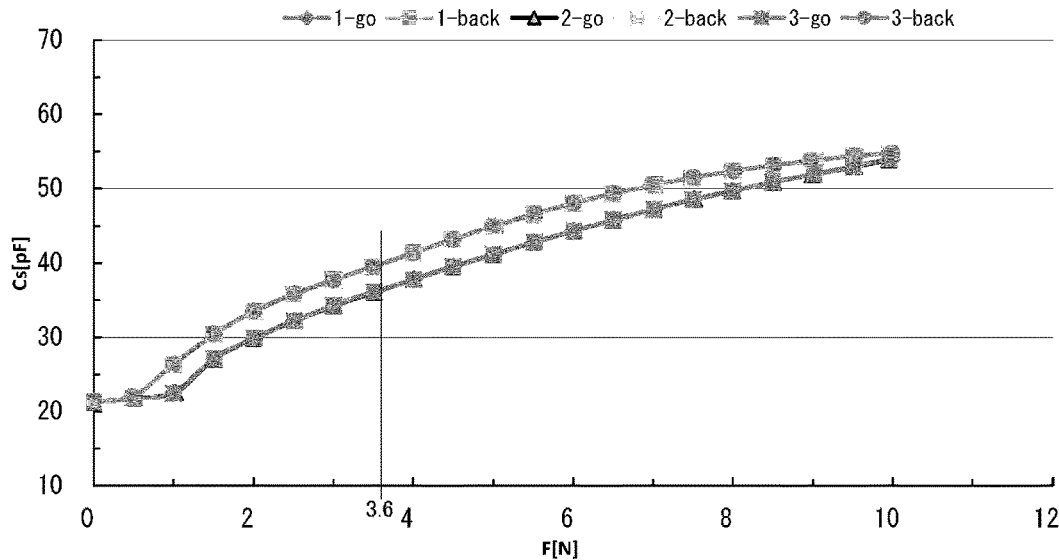
FIG. 2C is a graph showing capacitance-load curves obtained by the test in Example 1.

FIGS. 2A, 2B, and 2C show the capacitance-load curves in Comparative Example 1, Comparative Example 4, and Example 1, respectively.

FIG. 3 shows the capacitance-load curves in Examples 2 and 3 (one of three recordings for each).

Table 1 shows the initial value of the capacitance, the capacitance at the maximum load, the amount of change in capacitance, and the rate of change in capacitance in the respective Examples. Table 1 also shows the maximum hysteresis loss ratio as determined by the following Formula 1, the load at the maximum hysteresis loss ratio, and the sensor stress at the maximum hysteresis loss ratio (determined by dividing the load at the maximum hysteresis loss ratio by the plan view area (397 mm$^2$) of the first elastic layer and the second elastic layer). Each of these data is the average of three recordings.

Hysteresis loss ratio=100×(the capacitance during decompression−the capacitance during compression)/(the amount of change in capacitance at the maximum load)  Formula 1

Since the same polyurethane material is used for the first elastic layer and the second elastic layer in Comparative Examples 1 to 4, the above-determined sensor stress at the maximum hysteresis loss ratio corresponds to the stress of both the elastic layers at the maximum hysteresis loss ratio.

In Examples 1 to 3, different polyurethane materials (note: a combination of two types of polyurethane materials used in Comparative Examples 1 to 4) were used for the first elastic layer and the second elastic layer. Thus, Table 1 showed the difference in stress between both the elastic layers at the maximum hysteresis loss ratio determined in Comparative Examples 1 to 4.

As shown in Table 1, in Examples 1 to 3, the maximum hysteresis loss ratio of the sensor was lower than the maximum hysteresis loss ratio of at least one of the first elastic layer and the second elastic layer exhibiting higher hysteresis loss ratio. The extent of this reduction was large in Examples 1 and 3, wherein the difference in stress between both the elastic layers was 10 kPa or more at the maximum hysteresis loss ratio.

In particular, in Example 1, wherein the difference in stress between both the elastic layers was 11.5 kPa or more at the maximum hysteresis loss ratio, the maximum hysteresis loss ratio of the sensor was considerably lower than the maximum hysteresis loss ratio of both the elastic layers. According to Example 1, the recovery after compression is faster than in any case of Comparative Examples 1 and 4. Thus, the recovery period between a measurement period and a non-measurement period (normal period), which is one index of sensor performance, can be shortened, and the sensor is suitable for repeated measurement.

The present invention is not limited to the aforementioned examples, and the invention may be appropriately modified and embodied without departing from the spirit of the invention.

The invention claimed is:

1. A capacitive pressure-sensitive sensor comprising a first electrode, a first elastic layer, a second electrode, a second elastic layer, and a third electrode that are laminated in this order, characterized in that: the first elastic layer and the second elastic layer exhibit different stresses as measured during compression and decompression at a rate of 0.5 mm/minute at 23° C. when a capacitive hysteresis loss ratio is the maximum, and a stress difference is 3 kPa or more.

2. The capacitive pressure-sensitive sensor according to claim 1, wherein a stress of the capacitive pressure-sensitive sensor as measured during compression and decompression at a rate of 0.5 mm/minute at 23° C. when a capacitive hysteresis loss ratio is the maximum is an intermediate value between the stress of the first elastic layer and the stress of the second elastic layer.

3. The capacitive pressure-sensitive sensor according to claim 1, wherein each of the first elastic layer and the second elastic layer is a foamed product.

4. The capacitive pressure-sensitive sensor according to claim 2, wherein each of the first elastic layer and the second elastic layer is a foamed product.

* * * * *